Nov. 19, 1935.    J. A. POITRAS    2,021,582
TRIMMER CONDENSER
Filed Jan. 22, 1934    3 Sheets-Sheet 1
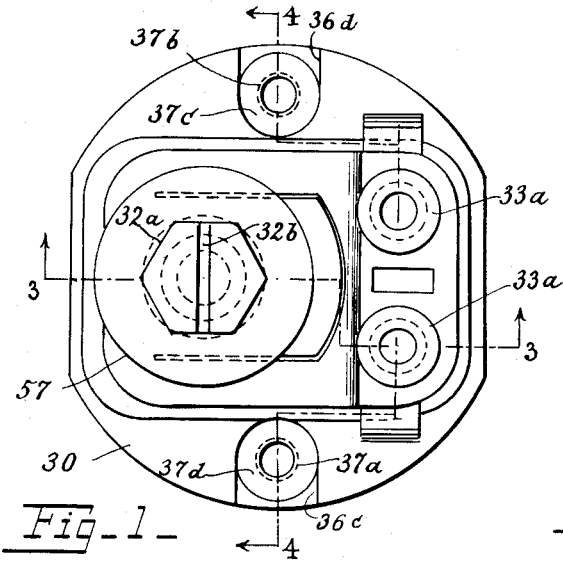
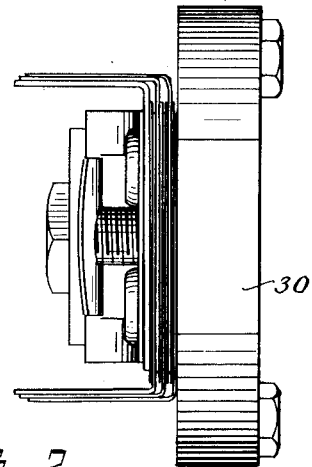
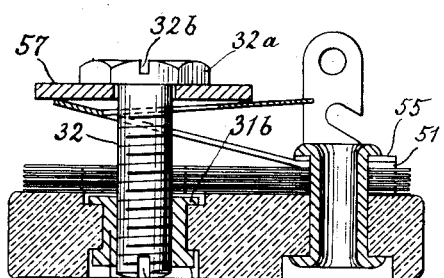
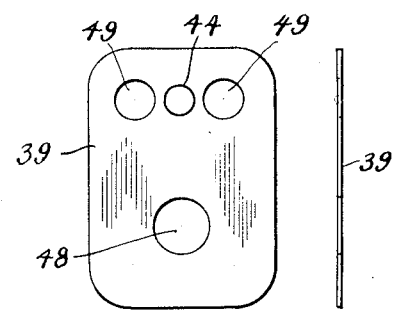
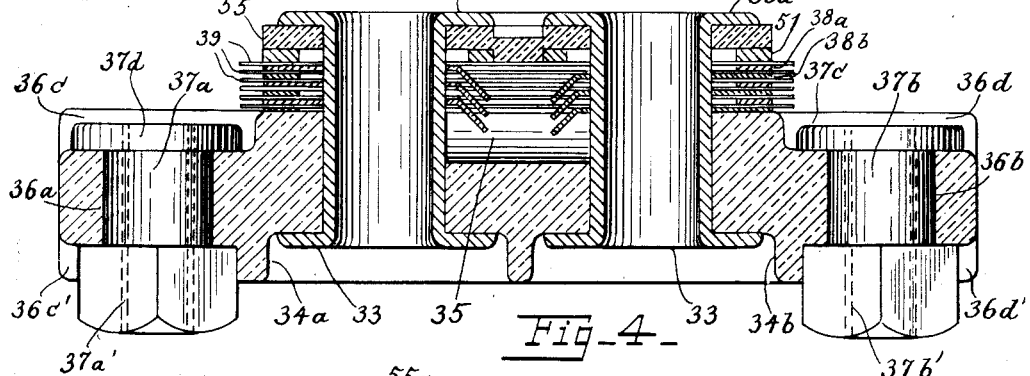
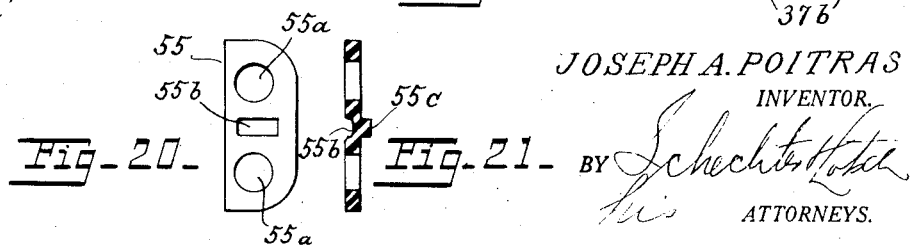
JOSEPH A. POITRAS
INVENTOR.
BY
ATTORNEYS.

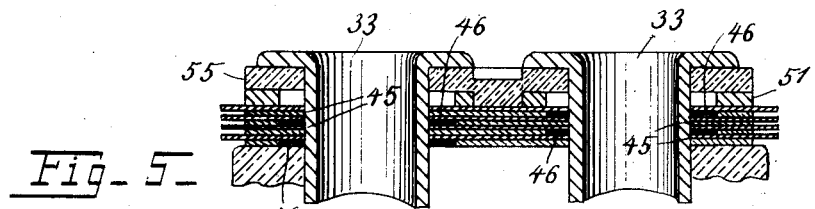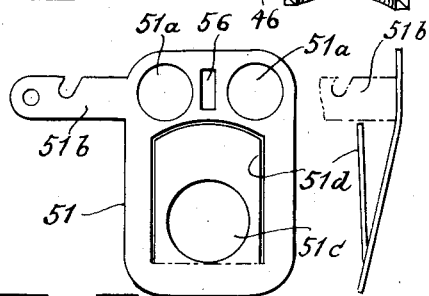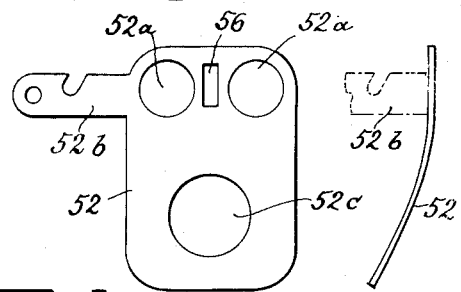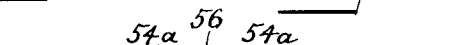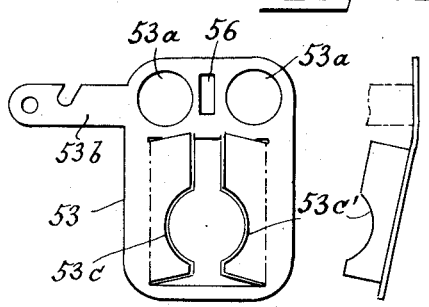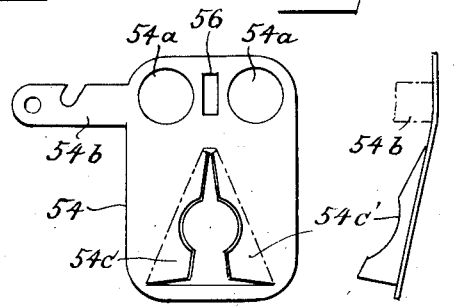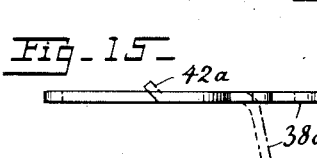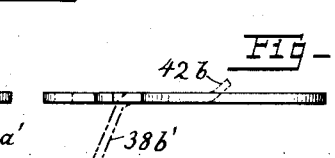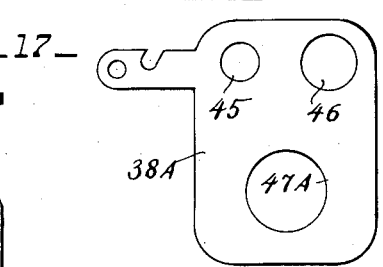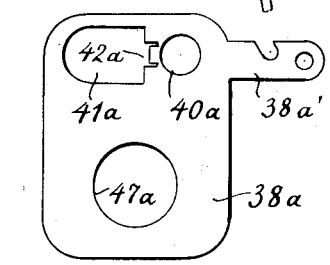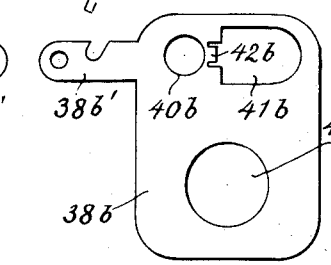

Nov. 19, 1935.　　　J. A. POITRAS　　　2,021,582
TRIMMER CONDENSER
Filed Jan. 22, 1934　　3 Sheets-Sheet 3
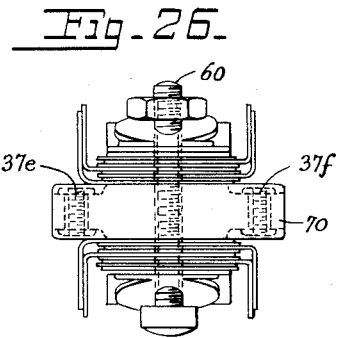
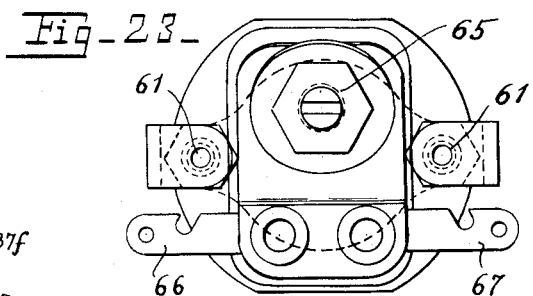
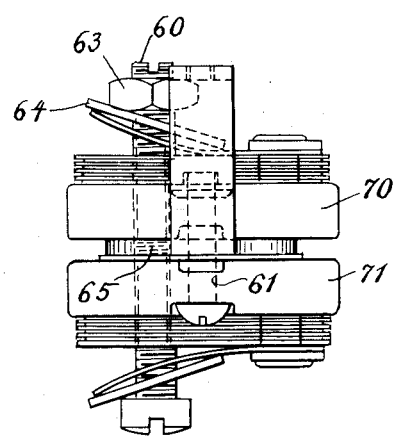
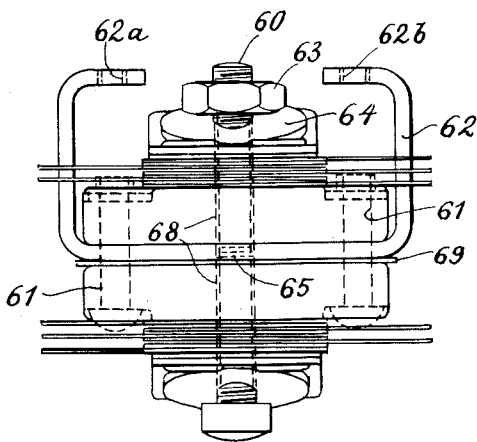
JOSEPH A. POITRAS
INVENTOR.
BY
ATTORNEYS.

Patented Nov. 19, 1935

2,021,582

UNITED STATES PATENT OFFICE 2,021,582

TRIMMER CONDENSER

Joseph A. Poitras, Fort Lee, N. J., assignor to Solar Manufacturing Corporation, a corporation of New York Application January 22, 1934, Serial No. 707,653

6 Claims. (Cl. 175—41.5)

This invention relates to improvements in variable electrical condensers and particularly to one class of condensers of this kind which are commonly called trimmer or padding condensers. These condensers which are often employed in modern radio sets, serve a similar purpose as the old style verniers, i. e. rotary variable condensers of only a few plates and small capacity which were used as adjuncts of variable larger rotary condensers so as to adjust the total capacity to a finer degree. In a similar way these trimmer or padding condensers which as hitherto was common practice, were built after the way of fixed plate condensers can be used in conjunction with the latter, i. e. connected in series, to vary the capacity of the latter to a very exact degree of fineness, or, if preferred, may be built with enough capacity to be used independently. Through their simplicity and compactness of construction they combine the advantages of small fixed condensers with the adjustability of the rotary variable condensers. These trimmer or padding condensers, however, so far as their types, known up to the present, are concerned, have certain drawbacks which will presently be described and it is the special purpose of this invention to correct such shortcoming by a novel construction, without complicating them or greatly adding to the manufacturing cost of the same.

These condensers as a general rule are built up of alternating layers of thin metal plates and mica sheets, the latter serving as insulation between the former. This assembly is anchored to an insulating base which may be either porcelain, hard rubber, isolantite, bakelite or some equivalent non-conducting material. The bulk or main part of the minimum capacity of the condenser is attained by building up a number of stationary members of the aforementioned kind in close contact and clamped tightly together, the actual number of alternating metal and mica sheets depending upon the minimum capacity to be reached. The top metal plate of the trimmer condenser, however, is usually a resilient phosphor bronze plate of heavier material than the others and is ordinarily sharply bent at an angle of approximately 30 degrees from its anchoring point so that a considerable and gradually increasing clearance is allowed between this plate and the closely packed flat plates when the screw which is adapted to clamp down the bent plate upon the flat ones, is not tightened. If the resilient bent plate therefore is not under tension, the total capacity of the condenser is always at its minimum value, and when the resilient plate is clamped down as far as it will go, the maximum capacity is reached. This plate, analogous in its function to the movable members in variable condensers of the rotary type, mentioned before, is therefore called the rotor plate.

The disadvantage of the described construction which is more or less typical of trimmer condensers up-to-date, is that with rotor plates, being straight, except at the bending line, the increase in capacity of the entire condenser is very slight almost all the way while the screw is gradually tightened, while during the last half turn of the screw, as it were, a very large percentage of the total increase in capacity takes place. The last half turn, mostly, accounts for approximately 80% of the total capacity adjustment, which of course is not a desirable feature.

But even so, the total available increase of capacity over the fixed one in these condensers is only a limited percentage, for example: if the minimum capacity is 1000 mmf. (milli-microfarads), the maximum capacity might be 1200 mmf. or only 20% more. The present invention, by a special way of mounting the so-called stator plates, makes it possible to widen the range between minimum and maximum capacity considerably, as will be explained later.

Other difficulties which will be specified more particularly in connection with the following description of the present device, arise from the task to properly insulate the stationary adjacent members or "stator" plates of the trimming condenser from each other and from the anchoring or adjusting screws which clamp the rotor plate down upon the stationary plates and generally pass through common perforations of the latter, being anchored in the insulating base plate.

The first general object of my invention therefore is to provide a rotor plate in trimming condensers which allows a more gradual increase in capacity from minimum to maximum.

A further object is to improve upon the way in which the adjusting means for the rotor plate is arranged in relation to the stationary part of the condenser.

A corollary object is to provide supporting means for the adjusting and anchoring screws of the rotor and stator plates which are not exposed to the possibility of a short circuit.

A further object of the invention is to simplify the assembly construction in connection with the last named object.

Another object is to provide means whereby the alternating conducting sheets are automatically kept in proper alignment with each other and in relation to the base plate.

Another object is to simplify the insulating means and to reduce the number of parts required for this purpose to the least possible.

A further object is to provide a novel condenser construction which can be used as a unit and can be used as a controlling adjunct to another static condenser of fixed capacity.

Another object is to provide novel means of mounting the condenser plates which normally serve as stator or minimum capacity condenser so that their value may be varied in two directions, toward a predetermined minimum as well as toward obtaining a higher maximum capacity.

A further object is to provide such a unit which can be combined with another like unit to form a dual condenser.

A further object in compass with the last named is to provide a dual condenser comprising two separate units of the described kind but joined Siamese-twin fashion, that is, in such a manner that they have one or more operating members in common.

A further object is to provide a dual trimmer condenser construction which can be made up of standard parts of single unit assemblies without requiring a special base or other special constructive parts, except bolts of special lengths, otherwise utilizing only standard unit parts.

A further object is to provide adequate supporting and mounting means for conveniently installing such a dual trimming condenser in a radio or similar outfit.

Another object in compass with the above named is to make this supporting and mounting means of such construction that it simultaneously forms an operative and controlling member of the double unit.

Other more specific objects and advantages of the apparatus will appear as the nature of the improvements are better understood, the invention consisting substantially in the novel arrangement and corelation of instrumentalities herein fully described and illustrated in the accompanying drawings wherein similar reference characters are used to describe corresponding parts throughout the several views and then finally pointed out and specifically defined and indicated in the appended claims.

The disclosure made the basis of exemplifying the present inventive concept suggests a practical embodiment thereof, but the invention is not to be restricted to the exact details of this disclosure, and the latter therefore is to be understood from an illustrative, rather than a restrictive standpoint.

The inventive idea involved is capable of receiving a variety of mechanical expressions, one of which for the purpose of illustration is shown in the accompanying drawings in which—

Fig. 1 is a top view of a single unit trimmer condenser made according to the principles of this invention;

Fig. 2 is a lateral view of this condenser;

Fig. 3 is a cross section taken along the line 3—3 of Fig. 1 and looking in the direction of the arrows;

Fig. 4 is a cross sectional view along the line 4—4 of Fig. 1, but drawn at an exaggerated scale, showing one way of anchoring and aligning the condenser plates. The terminal ends are omitted;

Fig. 5 is a similar fragmentary cross sectional view taken on the same line, but showing a modified way of anchoring and aligning these plates;

Figs. 6, 8, 10 and 12 show top views; and

Figs. 7, 9, 11 and 13 corresponding side views of rotor plate constructions made according to the principles of this invention. All four variations fulfill the objects named to a greater or lesser degree but fall within the range of my novel construction;

Fig. 14 is an intermediate or stator plate with a right hand terminal; and

Fig. 15 is an upper end view of this plate;

Fig. 16 is a similar stator plate, but with a left-hand terminal; and

Fig. 17 an upper end view of the latter plate.

Fig. 18 shows one of the insulating mica plates;

Fig. 19 is an end view of the same;

Figs. 20 and 21 are the top and sectional views respectively of the rotor insulating plate;

Fig. 22 shows a modified form of an intermediate insulating plate;

Figs. 23, 24 and 25 are the top, end and front views respectively of a condenser of dual construction, assembled according to this invention;

Fig. 26 shows at a smaller scale a dual condenser with a single base plate.

Similar characters indicate similar parts throughout the different views.

Referring more in detail to the drawings, numeral 30 denotes a non-conductive base plate of rather substantial thickness, made of porcelain or equivalent insulating material, as said before.

This base plate is provided with the necessary perforations and recesses for receiving and supporting the various metallic members and appurtenances of the condenser, viz: the aperture for holding the guiding brass nut 31 (Fig. 3) threaded for the adjusting screw 32. The latter has a hexagonal head 32a and can advantageously be likewise provided with a diametral slot 32b and another 32c at the end, so that in close quarters it may be reached by a screwdriver from either end. The guide nut 31 made of soft brass has an original flange 31a at the bottom, while the upper retaining flange 31b is formed after insertion into the porcelain base by a spinning tool or the like, so that the two flanges are firmly imbedded into the two opposite recesses provided in the porcelain.

Two further apertures are provided for the anchoring eyelets 33, which are inserted and—after assembling the necessary number of condenser plates, as well as the rotor and insulating washer, later on described—riveted or spun over in an analogous manner as the guiding nut 31, just described.

The fixed flanges of the eyelets 33 are imbedded into two recesses 34a and 34b which can be seen in Fig. 4, and the two perforations for the eyelets are inter-connected by a trench or groove 35, the purpose of which will be explained later.

Two more apertures are provided in the base plate, 36a and 36b, to facilitate the mounting of the same, countersunk from the surface on either side and scooped out toward the periphery as indicated at 36c, d and 36c', d' (see Figs. 1 and 4).

Imbedded in these apertures are bushings 37a and 37b having hexagonal heads and an internal thread 37a' and 37b' running axially throughout the whole bushing. The originally straight tubular shanks are, after assembly, also spun over in a well known and described manner, as indicated by 37c and 37d.

As mentioned before, the main body of these condensers is made up of alternating stationary metal and mica sheets, stacked up in alignment and prevented by appropriate means from being shifted out of alignment.

These stationary metal plates, the so-called stator plates are shown under numerals 38a, 38b in Figs. 14-17 and, as a modified form, 38A in Fig. 22, while the insulating mica sheets whose area is slightly greater than that of the metal sheets is shown as 39 in Figs. 18 and 19. As these thin metal plates, separated from each other by mica sheets, are destined for charges of alternately opposite polarity they are provided alternately with right or left hand terminals 38a' and 38b' or rather they are stamped out after the same pattern and alternately turned over before assembly. In the usual construction, used by the trade until now, for clamping the plates together, two round holes are punched into these metal plates used as stators, and it is necessary to provide extremely thin and small insulating washers to fill the clearances in these holes so that the assembling eyelet which passes through these holes should not cause a short circuit between stator plates of opposite polarity. In the novel device this construction is improved by providing only one round hole 40a or 40b respectively and one semi-oval shaped opening 41a or 41b respectively. In the assembly a number of round holes 40a will always alternate with semi-oval openings 41b, while the holes 40b will alternate with semi-oval openings 41a, counting from top to bottom. There is furthermore provided a tongue 42a or 42b respectively, recessed into the straight end of the semi-oval opening. These tongues are bent downwardly and the tongues of the lowermost stator plates fit into the trench or groove 35 of the porcelain base plate and thereby prevent their respective plates, which otherwise are anchored on one side only, with their round holes on a common bolt or eyelet, from turning from their common axis and getting out of alignment. This arrangement is well illustrated in Fig. 4. As succeeding plates are assembled, these tongues fit into the right or left hand underlying notches made by the underlying tongues and in this way lock plates of one kind firmly together. The central holes 44 of the insulating plates and the greater width of the opposite semi-oval aperture in the succeeding plate, charged with opposite polarity, provide the necessary clearance so that the tongues do not come in contact with any plate that is oppositely charged.

In making this assembly, it is no longer necessary to use individual insulating washers, as the assembly is built up by left and right hand stator plates, alternately arranged and merely separated from each other by a mica sheet between each two stator plates. This construction, while proving an economical saving of a number of auxiliary parts and a simplification, provides a safeguard against any lateral movement of the stator plates which are all interlocked by the tongues with each other as well as with the base plate. At the same time an incidental short circuiting or internal leakage of the condenser is effectively prevented.

But what distinguishes the arrangement of the stator plates from former arrangements in trimmer condensers is the feature that the stack of plates are bound firmly together only at one end, with the other end of the leafs open and only in loose proximity to each other, like the folds of a fan or a thin book. While it is of course not conspicuous in the illustration, in reality there is a slight, but actual divergence toward the ends of the stator plates, in direct proportion to the pressure with which the fixed ends are pressed together. This is partly due to the greater compressibility of the mica sheets between the metal plates or foils. Consequently when the full pressure of the adjusting bolt 32 is applied, it is possible to increase the initial capacity of the stator plates which normally throughout the adjusting range of the rotor stays unchanged to such a degree that the total variation between extreme minimum (with very loose initial setting of stator plates) and maximum (with the adjusting bolt completely screwed down) may vary between say 600 mmf. to 1200 mmf., a variation of 600 mmf. or an increase of 100% over the initial value. Therefore the stator plates, though normally of fixed capacity, actually represent a variable condenser.

Another possible combination of stator plates which is still an improvement over the customary and well known method of assembling is indicated by the plate 38A, shown in Fig. 22. These stators are each provided with one large and one small hole along the side at which the plates are anchored and permanently clamped together, viz: hole 45, into which the anchor bolt or tubular eyelet 33, which keeps this particular plate in place, closely fits, and a larger hole 46 through which the tubular eyelet which belongs to the oppositely charged set of stator plates, passes. Into the annular clearance, thus given, is fitted a thin insulating washer (not shown) and, provided that the assembly is carefully made with each washer in its proper place before the top flanges of the tubular eyelets are forcefully clamped down, all stator plates will be held securely in alignment; also each tubular eyelet or anchoring bolt can touch only such plates which are charged with the same polarity as itself, while the oppositely charged (and inverted) set of plates is separated from the same eyelet by the inserted insulating washers. It is of course advisable to use metallic plates and washers of exactly the same thickness. This construction results in the reduction of insulating washers necessary to one-half the usual number. The welding together of the terminal ends for each separate set of plates when the circuit connections are soldered, also helps to keep the plates in proper alignment. The big holes 47a for plate 38a or 47b for 38b, as well as the hole 47A for the modified stator plate 38A are clearance holes through which the adjusting screw 32, threaded into nut 31, can pass without touching. The corresponding hole 48 in the insulating plate, as well as the two anchor apertures 49 for the eyelets 33 should be just large enough to fit the inserted members without much friction.

The terminal extensions 38a' and 38b' are of the usual well known pattern, and after the plates are assembled they are bent upwardly, or rather at about right angles away from the base in unison, and connected in parallel to the circuit, either by soldering or by screw connections, as required. This is indicated in Fig. 2.

Figures 6 to 13 show the special and novel construction of the movable and adjustable member of the condenser, the so-called rotor plate, usually made of phosphor bronze and, although resilient, yet of greater thickness than the stator plates. Either one of these plates, 51, 52, 53 or 54 can be used advantageously, although for simplicity of manufacture the two first ones listed are preferable. Only one of course is employed.

It is to be observed that, as far as anchorage of the plate is concerned, they are so constructed that they do not come into contact with either one of the anchor bolts or eyelets 33, as the holes 51a, 52a, 53a and 54a are made wide enough to pass them with sufficient clearance. Only their terminals 51b, 52b, 53b or 54b which are to be arranged so as to be on the side, opposite to the terminal of the uppermost stator plate, come into conductive contact with either one of the two sets of terminals; otherwise they are operatively insulated, because the adjusting screw 32 and the guiding nut 31 with which they are in contact, are themselves insulated from contact with the other metal parts of the condenser.

To insure the insulation of the rotor plate, the heads of the eyelets 33a (see Fig. 4) are not riveted or spun down directly upon the rotor plate, but upon an insulating plate 55, shown in Fig. 20, made of suitable material, fiber, hard rubber or the like. Besides the two apertures 55a which closely fit around the shanks of the eyelets 33 (Fig. 4) this plate has a depression 55b which on the underside forms the extruded square-cornered key 55c. This key which should be molded or extruded with rather sharp corners fits into a small aperture 56, provided in either of the rotor plates 51, 52, 53 or 54, as is plainly shown in Fig. 4. This helps to keep the eyelets and the rotor plate in proper and secure alignment.

The rotor plate shown in Figs. 8 and 9 differentiates from the customary form of such rotor plates or blades primarily in that a sharp bend at the point of anchorage is avoided. The blade is neatly curved, and when therefore the adjusting screw 32 is clamped down upon the upturned end, the blade is gradually straightened out, more and more of the surface assuming a horizontal position, parallel to the stator plates, starting with the contact zone near apertures 52a.

The head of the adjusting screw 32 does not bear directly upon the rotor plate, but is provided with a washer 57. The screw 32 itself passes through an aperture 52c, wide enough to allow easy movement.

The rotor plate 51, shown in Figs. 6 and 7 shows a further development. Besides the apertures 51a, 56 and 51c, a tongue 51d is cut out by an incision in the form of an inverted U, and this tongue is bent in the same direction as the blade 51 was bent near the anchoring zone. These bends again must not be sharp but rather rounded. As Fig. 7 indicates, this construction makes the approach of the charged surface toward the stator plates more even and gradual.

Figures 10 and 11 represent another modification. The cutout tongue appears rather in the shape of a double winged door. The incision has therefore the shape of an I which consequently parts also the opening 53c into two semi-circular cutouts 53c, 53c'. The two projecting tongues 54c and 54c' shown in the arrangement of Figs. 12 and 13 differ from the last ones in that they are produced by a cut in the shape of an inverted T. The bending lines therefore meet at the top at an acute angle. The hole for the adjusting bolt is likewise split open into two semi-circular cutouts. The function of these rotor plates is similar to that of Fig. 6.

It remains to describe the way in which two condenser units, built essentially according to the principles of this invention, thus far explained, may be joined together to form a dual condenser, as shown in Figs. 23 to 25 inclusive.

Such a combination may be formed absolutely without any change of the constructive parts, used for single units, by strapping two complete units together, back to back, so that the adjustable or rotor plates of each of these two units are on the outside, one set being on top and the other on the bottom. The only change which obviously recommends itself for practical purposes and furthermore in order to dispense with special strapping members would be to use longer common adjusting screws 60 as well as tie bolts 61 in place of the bushings 37a, b, long enough to pass through both units simultaneously.

The common adjusting screw 60 must then of course be provided with an extra adjusting nut 63 and an extra washer 64 at the free end, in order to retain the other rotor plate. In order to prevent eventual jamming of the threads, one of the guiding nuts 31 (see Fig. 3) can be dispensed with. In such assembly one set of trimmer plates is adjusted by means of clamping down the screw on the rotor plate, while the opposite trimmer condenser can be adjusted by means of clamping down the nut.

The arrangement as illustrated shows also a mounting bracket 62 clamped between the two units. It has the shape of a stirrup with a broad base, forming a separator between the two porcelain bases. At 65 this base is threaded for the adjusting screw and in this case no special guide nuts 31 are required and the perforations 68 in the porcelain bases could be made smaller, if so desired. The upturned ends of the stirrup are threaded at 62a and 62b for the reception of any supporting or anchoring bolts or screws.

Underneath the broad base of the stirrup bracket is a washer 69 preferredly made of soft rubber, not so much for insulating purposes as to form a compressible cushion to prevent cracking of the porcelain bases 70 and 71, when the tie bolts 61 are tightened. The terminal ends 66 and 67 are shown in flattened out position, before they are bent outwardly and soldered together or connected.

The illustrations indicate how a dual condenser can be built by tying two separate and complete units together, the only advisable, but not indispensable modifications, consisting in the choice of longer bolts or adjusting screws, but it would be also entirely within the scope of this invention if one of the non-conductive base plates were dispensed with and a single base plate were used with symmetrical surfaces as indicated in Fig. 26. Instead of the stirrup-like bracket used for mounting other simple means for mounting, for instance, the threaded tubular bushings 37e and 37f, suggest themselves.

In accordance with the provisions of the patent statutes I have described my invention, but I desire it understood that it is not confined to the particular form shown and described, the same being merely illustrative, and that the invention can be carried out in other ways without departing from the spirit of my invention, and therefore, I claim broadly the right to employ all equivalent instrumentalities coming within the scope of the appended claims, and by means of which, objects of my invention are attained and new results accomplished, as it is obvious that the particular embodiments herein shown and described are only some of many that can be employed to attain these objects and accomplish these results.

Having now described my invention, what I claim as new, and desire to secure by Letters Patent, is:

1. A trimmer condenser, comprising two sets of superimposed stationary conductive plates, insulated from each other, and an insulated superimposed movable plate, one end of which is clamped to the stationary plates, the remaining part of which is split and bent into outwardly diverging portions and compressive means to gradually straighten out these bent and diverging portions into a flat surface, adjacent to the outer surface of the stationary plates, increasing thereby the capacity of the condenser.

2. A trimmer condenser of variable capacity, comprising two sets of superimposed stationary conductive plates, insulated from each other and an insulated superimposed movable plate, forming a normally curved spring blade, subdivided into smaller blade portions, separately curved away from the main surface and mechanical means to force all curved portions back into a straight plane, adjacent and parallel to the top plane of the stationary plates, to increase thereby the condenser capacity.

3. A trimmer condenser of variable capacity, comprising two sets of superimposed stationary plates, insulated from each other and an insulated superimposed movable plate, having the shape of a curved resilient tongue whose base is tightly clamped upon said stationary plates while the remaining portion when not strained is rising at an acute angle above them, said tongue having an incision in the form of a U with its base adjacent the clamped down portion and its partly cutout portion between the legs of the U raised also at an acute angle forming thereby a reversed tongue within a tongue, and means to clamp down the raised tongue portions gradually into a common straight plane, adjacent and parallel to the aforesaid stationary plates, thus controlling the increase over the capacity minimum, when the movable plate is not under tension.

4. The combination with a dual trimming condenser comprising two single trimming condensers, turned back to back with non-conductive surfaces; of a mounting bracket having the shape of a stirrup, on the middle portion of which the two single condensers are firmly clamped on opposite sides.

5. The combination with a dual trimming condenser comprising two single trimming condensers, turned back to back with non-conductive surfaces and having a common adjusting screw for controlling their variable capacity members; of a mounting bracket, having the shape of a stirrup, on the middle portion of which the two single condensers are firmly clamped on opposite sides, and threaded so as to serve as a guiding and supporting nut for the common adjusting screw.

6. The combination with a dual trimming condenser comprising two single trimming condensers, turned back to back with non-conductive surfaces, each condenser consisting of a stack of stationary plates of opposite polarity, alternately arranged, and a superimposed movable plate, positioned on the outside and having an adjusting screw, common to both condensers for controlling their variable capacity members; of a mounting bracket, having the shape of a stirrup, on the middle portion of which the two single condensers are firmly clamped on opposite sides, and threaded so as to serve as a guiding and supporting nut for the common adjusting screw.

JOSEPH A. POITRAS.